(12) United States Patent  (10) Patent No.: US 9,154,224 B2
Yin et al.  (45) Date of Patent: Oct. 6, 2015

(54) METHOD, APPARATUS AND SYSTEM FOR TESTING AN OPTICAL NETWORK

(75) Inventors: Jinrong Yin, Shenzhen (CN); Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 13/486,728

(22) Filed: Jun. 1, 2012

(65) Prior Publication Data

US 2012/0237213 A1 Sep. 20, 2012

Related U.S. Application Data

(63) Continuation of application No. PCT/CN2010/079213, filed on Nov. 29, 2010.

(30) Foreign Application Priority Data

Dec. 1, 2009 (CN) .......................... 2009 1 0188476
Dec. 31, 2009 (CN) .......................... 2009 1 0260757

(51) Int. Cl.
*H04B 10/07* (2013.01)
*H04L 12/26* (2006.01)
*H04B 10/071* (2013.01)

(52) U.S. Cl.
CPC .......... *H04B 10/071* (2013.01); *H04L 12/2697* (2013.01); *H04L 43/50* (2013.01)

(58) Field of Classification Search
USPC ...................................... 398/21, 28
See application file for complete search history.

(56) References Cited

U.S. PATENT DOCUMENTS

2004/0019443 A1* 1/2004 Jones et al. ...................... 702/79
2008/0187310 A1 8/2008 Tanaka
2009/0196250 A1 8/2009 Feng et al.
2011/0110662 A1* 5/2011 Wellbrock et al. .............. 398/45

FOREIGN PATENT DOCUMENTS

CN 101150454 A 3/2008
CN 101217313 A 7/2008
CN 101222369 A 7/2008
CN 101262680 A 9/2008

(Continued)

OTHER PUBLICATIONS

Extended European Search Report in corresponding European Patent Application No. 10834217.1 (Oct. 4, 2012).
Written Opinion of the International Searching Authority in corresponding International Patent Application No. PCT/CN2010/079213 (Mar. 10, 2011).

(Continued)

*Primary Examiner* — Nathan Curs
(74) *Attorney, Agent, or Firm* — Leydig, Voit & Mayer, Ltd.

(57) ABSTRACT

Embodiments of the present disclosure describe a method and an apparatus for testing an optical network, which may be applicable to an integrated OTDR and the field of optical network technologies. The method includes obtaining a maximum test time of a single group test; dividing a total test time into at least two groups of single group test time that is not greater than the maximum test time when the total test time is greater than the maximum test time of the single group test; performing the single group tests in sequence according to each single group test time; and instructing optical network equipment to restore to a normal working state when the single group test time corresponding to each single group test ends.

11 Claims, 9 Drawing Sheets

(56) References Cited

FOREIGN PATENT DOCUMENTS

| WO | 95/25274 A1 | 9/1995 |
|----|-------------|--------|
| WO | 03/060456 A1 | 7/2003 |
| WO | 2004/079404 A2 | 9/2004 |

OTHER PUBLICATIONS

International Search Report in corresponding International Patent Application No. PCT/CN2010/079213 (Mar. 10, 2011).
1st Office Action in corresponding Chinese Patent Application No. 200910260757.3 (May 9, 2013).

* cited by examiner

METHOD, APPARATUS AND SYSTEM FOR TESTING AN OPTICAL NETWORK

CROSS-REFERENCE TO RELATED APPLICATIONS

This application is a continuation of International Application No. PCT/CN 2010/079213, filed on Nov. 29, 2010, which claims priority to Chinese Patent Application No. 200910188476.1, filed on Dec. 1, 2009, and Chinese Patent Application No. 200910260757.3, filed on Dec. 31, 2009, all of which are hereby incorporated by reference in their entireties.

FIELD OF THE INVENTION

The present invention relates to the field of optical network technologies, and in particular, to a method, an apparatus and a system for testing an optical network.

BACKGROUND OF THE INVENTION

At present, an OTDR (Optical Time Domain Reflectometer, optical time domain reflectometer) is test equipment widely applied in optical fiber networks. A basic principle of the OTDR is sending probe light to an optical fiber, and receiving a reflected/scattered optical signal on an optical fiber link. Through analyzing and processing a transmitted signal and the received reflected/scattered signal, a real state of the optical fiber link including line attenuation and a type and position of an event point (bending, connector or fusion splice point) may be reflected. The OTDR is capable of implementing recognition and location of various events on the optical fiber link in a single-end test manner; therefore, the OTDR plays an important role in test, fault location and troubleshooting of an ODN (Optical Distribution Network, optical distribution network) in a PON (Passive Optical Network, passive optical network) system. In order to decrease cost, simplify a network structure and reduce the influence of a test signal on data communication, it is brought forward in the industry to integrate the OTDR to an optical module of an OLT (Optical Line Terminal, optical line terminal), to generally reuse a data transmitter in the optical module of the OLT as a transmitter of the OTDR, and to insert the test signal into a data signal or bear the test signal after modulation on the data signal, that is, using a wavelength for data transmission as a test wavelength to bear the test signal. In one implementation solution, reusing a LD (Laser Diode, laser diode) in the optical module as an OTDR LD, and reusing a MPD (Monitor Photo Diode, monitor photo diode) in the optical module as an OTDR PD is adopted as a hardware implementation manner; while for software control, the following manner is adopted: the OLT first sends an OMCI (ONT Management Control Interface, ONT management control interface) message to notify an ONU (Optical Network Unit, optical network unit) or an ONT (Optical Network Terminal, optical network terminal) to perform OTDR test setting; the ONU needs to perform clock locking, and sets a test start time and a test end time, and then the OLT inserts test data to downlink data for test through a specific identifier; the ONU does not perform clock extraction during the test; and the ONU quickly performs clock recovery when the test ends. However, the ONU is easily disconnected during the test, thereby causing service interruption.

SUMMARY OF THE INVENTION

Embodiments of the present invention provide a method, an apparatus and a system for testing an optical network, so as to protect a TC layer state machine of an ONU during a test, and avoid ONU disconnection and further services interruption due to a long-time test.

In order to achieve the above objectives, an embodiment of the present invention adopts the following technical solutions.

A method for testing an optical network, applicable to an integrated optical time domain reflectometer, includes:

obtaining a maximum test time of a single group test;

when a total test time is greater than the maximum test time of the single group test, dividing the total test time into at least two groups of single group test time that is not greater than the maximum test time;

performing the single group tests in sequence according to each single group test time; and when the single group test time corresponding to each single group test ends, instructing optical network equipment to restore to a normal working state.

An apparatus for testing an optical network, applicable to an integrated optical time domain reflectometer, includes:

an obtaining unit, configured to obtain a maximum test time of a single group test;

a grouping unit, configured to divide a total test time into at least two groups of single group test time that is not greater than the maximum test time when the total test time is greater than the maximum test time of the single group test;

a test unit, configured to perform the single group tests in sequence according to each single group test time; and an instruction unit, configured to instruct optical network equipment to restore to a normal working state when the single group test time corresponding to each single group test ends.

The method, apparatus and system for testing an optical network provided by the embodiments of the present invention are applicable to the integrated optical time domain reflectometer and an integrated optical frequency domain reflectometer. For example, an OLT integrated with an OTDR or an OFDR may adopt the method and apparatus for testing an optical network provided by the embodiments of the present invention. According to the embodiment of the present invention, the maximum test time of the single group test needs to be obtained; when the total test time is greater than the maximum test time of the single group test, the total test time is divided into at least two groups of single group test time that is not greater than the maximum test time, so as to ensure that the duration of each single group test does not exceed the maximum test time of the single group test. Therefore, the optical network equipment does not restore to an initial state, which saves time of re-registration and re-ranging of the optical network equipment. In this way, the optical network equipment may not be disconnected due to the optical network test, which ensures normal operation of services in the optical network, decreases system processing complexity while reduces the influence of the optical network test on communication, and improves customer satisfaction.

BRIEF DESCRIPTION OF THE DRAWINGS

To illustrate the technical solutions in the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art may obtain other drawings according to the accompanying drawings without creative efforts.

DETAILED DESCRIPTION OF THE EMBODIMENTS

The technical solutions in the embodiments of the present invention are clearly and fully described in the following with reference to the accompanying drawings. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
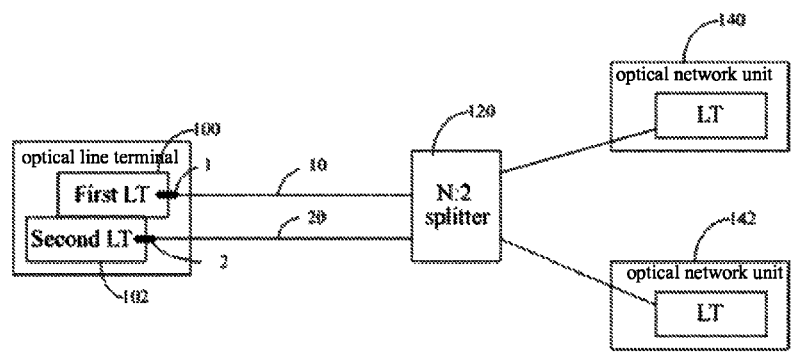
FIG. 1 is a schematic architecture diagram of a conventional network of a PON Type B protection solution.

During a test, an ONU may be disconnected due to many reasons. One of the reasons is that in a Type B protection solution, a central office has at least two LTs, and these two LTs are connected to the ONU in such scenario. Referring to FIG. 1, in the Type B protection solution, a first LT 100 and a second LT 102 are included. The first LT 100 and the second LT 102 may be in one OLT, or may be in different OLTs. The first LT 100 and the second LT 102 back up each other. The first LT 100 and the second LT 102 may communicate with each other. The first LT 100 is connected to a backbone optical fiber 10 through a PON port 1, and the second LT 102 is connected to a backbone optical fiber 20 through a PON port 2. The backbone optical fiber 10 and the backbone optical fiber 20 are connected to a splitter, and the splitter is connected to optical network units (an ONU 140 and an ONU 142). That is, both the PON port 1 and the PON port 2 are connected to the ONU 140 and the ONU 142.

When a test is performed under the Type B protection scenario, the Type B protection solution of a PON merely protects the backbone optical fiber and the PON port of the OLT. Therefore, when a standby PON port is started to perform a test, if a fiber break does not occur in an optical fiber connected to the standby PON port, a test signal transmitted by the standby PON port is superimposed with a data signal transmitted by an active PON port after passing through the splitter, and then the superimposed test signal and the data signal are transmitted to user terminal equipment, which leads to a bit error when the user terminal equipment restores data and even causes disconnection of the user terminal equipment.

An embodiment of the present invention provides a method for detecting a passive optical network, where the provided method is capable of detecting a passive optical network under the Type B protection solution. It is taken as an example in this embodiment that a second LT and a first LT are in one OLT and the second LT is a standby LT.

Figure 2:
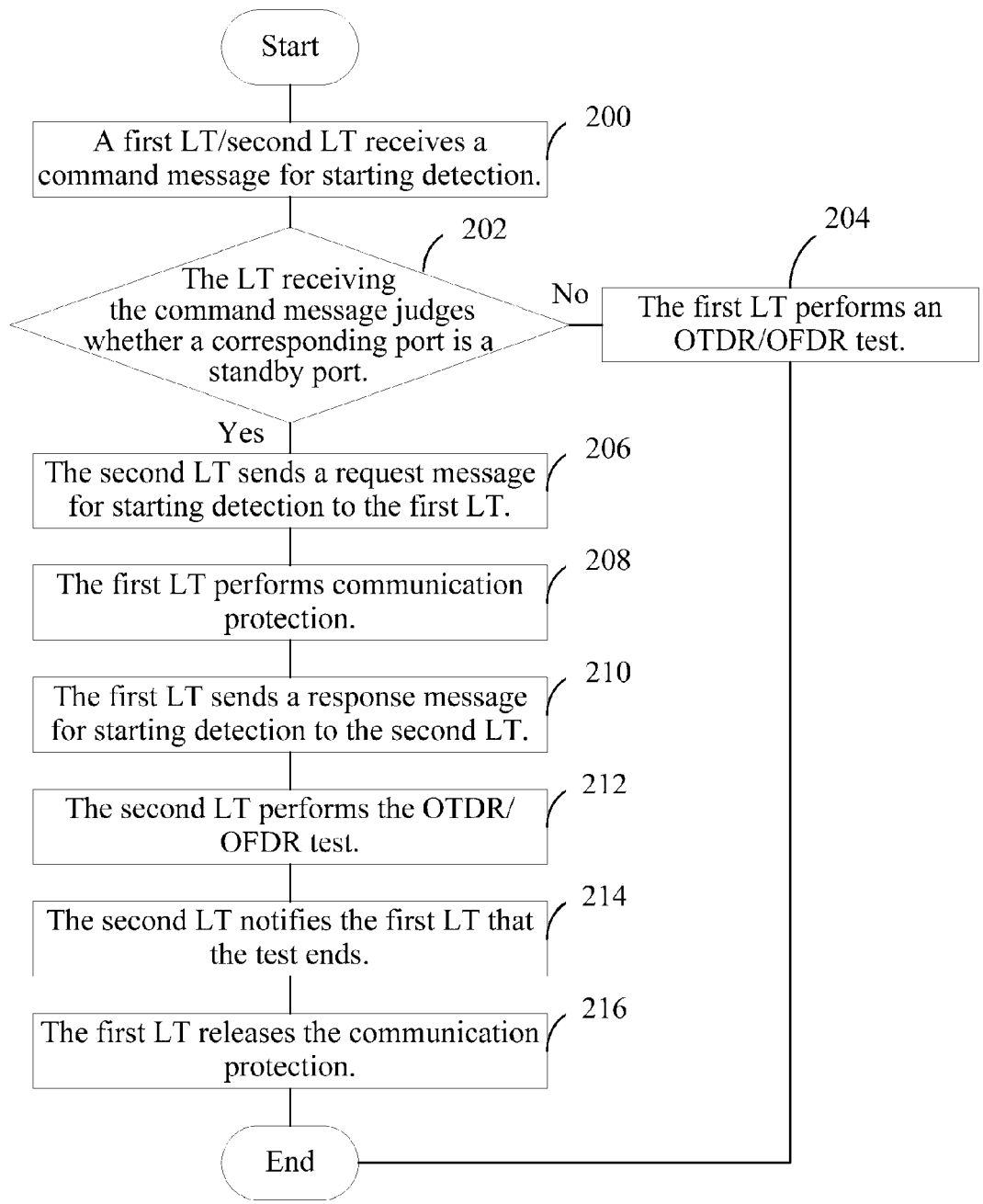
FIG. 2 is a flow chart of a method according to an embodiment of the present invention.

A flow chart of the method for detecting the passive optical network provided in this embodiment is as shown in FIG. 2, and the method includes the following.

Step 200: An LT receives a command message for starting passive optical network detection.

It may be a network management system or maintenance personnel that sends the command message to the LT, and a sending manner may be scheduled sending.

The command message may include port information (for example, a block number, a slot number or a port number) of a port to be detected, a test pulse width, a measuring range and detection time.

Step 202: The LT receiving the command message judges a working state of a corresponding PON port.

The working state of the PON port may be, but is not limited to, whether the PON port works under the Type B protection scenario and/or an active/standby state of the PON port.

If the LT receiving the command message is the second LT, the second LT determines that the corresponding PON port is a standby PON port under the Type B protection scenario, and performs step 206. If the LT receiving the command message is the first LT, the first LT determines that the corresponding PON port is an active PON port under the Type B protection scenario, and performs step 204.

Step 204: The first LT starts an OTDR or OFDR test.

As the active LT, the first LT starts the OTDR or OFDR (Optical Frequency Domain Reflectometer, optical frequency domain reflectometer) test. A test signal may be an independent test pulse or a test sequence (such as a Golay complementary sequence, a pseudo random sequence, or an OFDM (Orthogonal Frequency Division Multiplex) sequence. Alternatively, the test sequence may be inserted into a data signal, or the test signal may further be modulated to the data signal (for example, performing amplitude modulation on the data signal to bear the test signal). When the test signal is inserted into the data signal, or when the test signal is modulated to the data signal, the data signal may be an idle frame.

After sending the test signal, the first LT starts to detect a reflected/scattered signal obtained through an optical distribution network reflecting/scattering the test signal received on the PON port 1, and may determine a parameter of an optical fiber line according to a parameter of the sent test signal and the reflected/scattered signal detected on the PON port 1. For example, a length of the optical fiber line may be determined according to a time difference between the transmitted test signal and the reflected/scattered signal detected on the PON port 1; an OTDR test curve (when the first LT performs the OTDR test) or an OFDR test curve (when the first LT performs the OFDR test) may be obtained after processing the transmitted test signal and the detected reflected/scattered signal, thereby obtaining state assessment information of the optical fiber line, and then a passive optical network detection process ends.

The processing the transmitted test signal and the detected reflected/scattered signal may include: directly performing average computing on the reflected/scattered signal detected in multiple times to eliminate noise interference and improve a signal-to-noise ratio; or performing correlation computing (Correlation Computing) and then average computing on the transmitted test signal and the detected reflected/scattered signal to eliminate interference of the transmitted test signal on the reflected/scattered signal and improve the signal-to-noise ratio; or first performing average computing on the reflected/scattered signal detected in multiple times, and then performing correlation computing on the reflected/scattered signal and the transmitted test signal to improve the signal-to-noise ratio.

Step 206: The second LT sends a request message for starting detection to the first LT.

As a standby LT, the second LT sends the request message for starting passive optical network detection to the first LT, where the request message carries a detection parameter, and the detection parameter may include one or more types of information of a test start time, a test end time and a test duration. When the first LT and the second LT are in the same OLT, the detection parameter may be borne in a pre-defined internal message. When the first LT and the second LT are in different OLTs, the detection parameter may be borne in an OAM message.

Step 208: After receiving the request message for starting detection sent by the second LT, the first LT determines that a test for a PON port 2 on the second LT needs to be performed, so as to perform communication protection, for example, performing communication protection on communication between the PON port 1 and at least one optical network unit.

During a normal communication process, multiple functions are established between the first LT and the PON port 1, which include, but are not limited to, a service transmission function, an alarm function and a terminal management function. After receiving the request message from the second LT, the first LT performs the communication protection according to the request message, and communication protection manners include one or more of the following types.

(1) The first LT marks a test state of the PON port 2 of the second LT, and performs protection on at least one of the functions of service transmission and terminal management, for example, suspending the service transmission function established between the first LT and the ONU during the test.

Specifically, the first LT marking the test state of the PON port 2 of the second LT may be: the first LT establishes a test state entry to record port information and the test state of the PON port 2 of the second LT. The port information may be a block number/slot number/port number of the PON port 2 of the second LT. The test state may indicate that the test is started or the test is not started, which may be indicated by a test state value. For example, 0 is used to indicate that the test is started, and 1 is used to indicate that the test is not started.

Optionally, the first LT may also start a test state timer to control the test state of the PON port 2 of the second LT, where the test state timer is configured to control the test state of the PON port 2 of the second LT. The first LT may start the test state timer when the PON port 2 of the second LT starts the test, and close the test state timer when receiving a test end indication of the PON port 2 of the second LT and/or when the test state timer times out. In an embodiment of this application, a control parameter of the test state timer may be recorded in the test state entry. The control parameter of the test state timer may include: a timeout duration indicating a test duration of the PON port 2 of the second LT. Multiple test state timers of the PON port of the LT may be set. For example, in the embodiment of the present invention, in a group test application of the PON port 2 of the second LT, multiple test state timers may be provided, and each test state timer corresponds to a level. Two levels are taken as an example. A first level test state timer is configured to indicate whether each single group test ends when the PON port 2 of the second LT has multiple group tests. The first level test state timer is started when the PON port 2 of the second LT starts the single group test, and is closed when a single group test duration of the PON port 2 of the second LT ends, where the timeout duration may be equal to the single group test duration. A second level test state timer is configured to indicate whether the test of the PON port 2 of the second LT ends. The second level timer is started for timing at least before a first group test of multiple group tests of the PON port 2 of the second LT, and finishes timing after a last group test of the multiple group tests of the PON port 2 of the second LT ends. The timeout duration of the second level test state timer includes a sum of multiple single group test durations of the PON port 2 of the second LT and time intervals between different group tests. If the test is divided into three group tests, each single group test duration is Tt, and a group test interval is Tg, the timeout duration of the second level test state timer is 3*Tt+2*Tg. The timeout duration of the second level test state timer may further include a preparation delay before the first group test and/or a wait delay after the last group test ends. In a word, it should be ensured that the timeout duration of the second level test state timer is greater than the sum of multiple single group test durations of the PON port 2 of the second LT.

(2) The first LT marks a test state of the PON port 2 of the second LT, and maintains normal communication with the ONU before the test of the PON port 2 of the second LT ends, for example, performing service transmission and/or terminal management. A method for making the test state is the same as the method (1), and details thereof are not described here again.

The first LT may not perform extra operations during the test, that is, functions and state machines remain unchanged during the test as before the test. The first LT may also mask or suspend an alarm output function of the PON port 1 during the test, so that the first LT does not output alarm information and/or error information to upper layer equipment such as an equipment management system (Equipment Management System, EMS) and an operation support system. The alarm information includes, but is not limited to, at least one of the following types: a loss of signal (LOS) alarm of the PON port of the LT, a loss of frame (LOF) alarm of the PON port of the LT, a loss of signal alarm of an ONUi (LOSi), and a loss of frame alarm of the ONUi (LOFi). The error information may include: an uplink bit-interleaved parity error (BIP error) of the ONUi, and a downlink bit-interleaved parity error (BIP error) of the ONUi.

Figure 3:
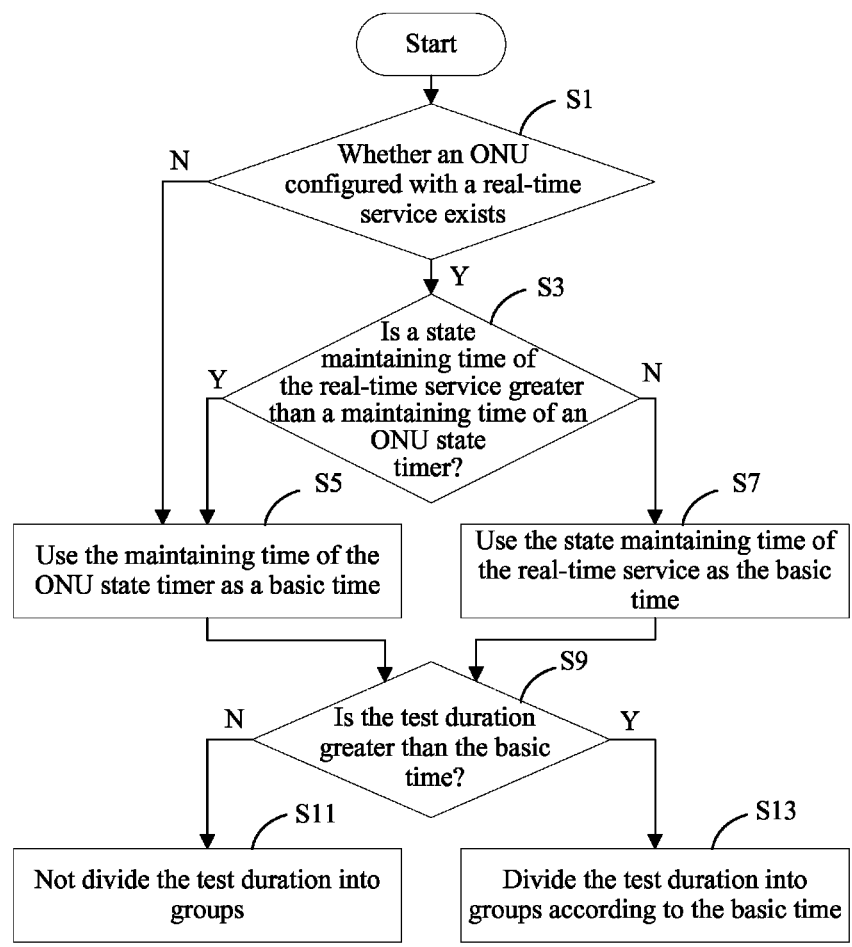
FIG. 3 is a flow chart of making a test policy according to an embodiment of the present invention.

Optionally, the first LT may also determine a test policy of the PON port 2 of the second LT according to the detection parameter in the request message. Specifically, a process for determining the test policy may be as shown in FIG. 3, which includes the following.

Step S1: Judge whether an ONU configured with a real-time service exists under a port to be tested, (generally, a real-time service, for example, a TDM service, has a control channel apart from a data channel. The control channel usually requires information interaction between a server and a client to maintain a state. Once the server and the client are incapable of performing information interaction for a long time, the control channel will be removed, and the data channel will become invalid, thereby causing service interruption.

For example, a state maintaining time of the TDM service is usually 50 ms and: if no ONU configured with the real-time service exists, perform step S5; if an ONU configured with the real-time service exists, perform step S3.

Step S3: Compare values of a state maintaining time of the real-time service and a maintaining time of an ONU state timer, and use the smaller one as a basic time. If the state maintaining time of the real-time service is greater than the maintaining time of the ONU state timer, perform step S5; and if the state maintaining time of the real-time service is not greater than the maintaining time of the ONU state timer, perform step S7.

Step S5: Use the maintaining time of the ONU state timer as the basic time and perform step S9.

A recommended value in a G984.3 standard is 100 ms, and a recommended value in an EPON standard is 200 ms.

Step S7: Use the state maintaining time of the real-time service as the basic time and perform step S9.

Step S9: Judge whether the test duration is greater than the basic time, and: if the test duration is greater than the basic time, perform step S13; if the test duration is not greater than the basic time, perform step S11.

Step S11: Not divide the test duration into groups. That is, the test duration remains unchanged, and the number of the test group is 1.

Step S13: Divide the test duration into groups according to the basic time.

A test duration of each group may be used as the basic time, and the number of the test groups may be a minimum integer greater than or equal to a value obtained by dividing the test duration with the basic time.

Step 210: The first LT sends a response message for starting detection to the second LT.

The response message includes the test policy of the PON port 2 of the second LT. The test policy may be instructing the PON port 2 of the second LT to start the test immediately and continue the test until the test duration ends. The test policy may also include the test duration groups and time intervals between the groups, and instruct the second LT to perform a time domain/frequency domain test in the specified test duration group according to the interval. The test duration group may include: the number of groups and a test duration of each group.

When the first LT and the second LT are in the same OLT, the response message may be borne in a pre-defined internal message. When the first LT and the second LT are in different OLTs, the response message may be borne in an OAM message, or a lay 2 control (Layer 2 Control, L2C) message.

Step 212: The second LT responds to the response message for starting detection, and performs the OTDR/OFDR test.

After receiving the response message for starting detection, the second LT sends a first optical signal bearing the test signal to the backbone optical fiber connected to the PON port 2 according to the response message for starting detection. A format and a sending manner of the test signal are described above, and details thereof are not described here again.

After sending the test signal, the second LT starts to detect a second optical signal received on the PON port 2, where the second optical signal includes a reflected/scattered signal obtained through the ODN reflecting/scattering the test signal; and the second LT may determine a parameter of an optical fiber line according to a parameter of the sent test signal and the reflected/scattered signal detected on the PON port 2. For example, a length of the optical fiber line may be determined according to a time difference between the transmitted test signal and the reflected/scattered signal detected on the PON port 2; and an OTDR test curve (when the first LT performs the OTDR test) or an OFDR test curve (when the first LT performs the OFDR test) may be obtained after processing the transmitted test signal and the detected reflected/scattered signal, thereby obtaining state assessment information of the optical fiber line.

The processing the transmitted test signal and the detected reflected/scattered signal may include: directly performing average computing on the reflected/scattered signal detected in multiple times to eliminate noise interference and improve a signal-to-noise ratio; or performing correlation computing and then average computing on the transmitted test signal and the detected reflected/scattered signal to eliminate interference of the transmitted test signal on the reflected/scattered signal and improve the signal-to-noise ratio; or first performing average computing on the reflected/scattered signal detected in multiple times, and then performing correlation computing on the reflected/scattered signal and the transmitted test signal to improve the signal-to-noise ratio.

Step 214: The second LT sends a message indicating that the test ends to the first LT.

After the test of the PON port 2 of the second LT ends, a notification message is sent to the first LT to indicate that the test of the PON port 2 of the second LT ends, where the notification message may be a pre-defined internal message or an OAM message.

Step 216: The first LT releases the communication protection during the test, that is, communication is restored, and functions suspended during the test, such as service transmission, terminal management, and alarm output, are restored.

When the first LT receives a test end indication of the PON port 2 of the second LT, the first LT first checks whether the test state of the PON port 2 of the second LT is marked. If the test state of the PON port 2 of the second LT is not marked, the first LT ignores the test end indication of the PON port 2 of the second LT, so as to avoid sending to each ONU the notification message that instructs the ONU to enter a normal working state when receiving a false test end indication message, thereby causing a waste of management bandwidth. If the test state of the PON port 2 of the second LT is marked, the first LT performs communication restoration processing on the ONUs 140 and 142. The communication restoration processing includes: the first LT sends the notification message to the ONUs 140 and 142 through the PON port 1, where the notification message instructs the related ONUs to enter the normal working state. Specifically, checking whether the test state of the PON port 2 of the second LT is marked may be checking whether a test state entry with the port information being port information of the PON port 2 of the second LT and the test state being a start state exists; and if such test state entry exists, it is considered that the test state of the PON port 2 of the second LT is marked.

Optionally, before the first LT sends the notification message to the ONUs 140 and 142, the following operations may be performed.

(A) It is assumed that the first LT adopts the communication protection manner (1) in step 208.

The first LT restores a data sending function of the PON port 1, and sends the notification message to each ONU through the PON port 1, where the notification message instructs the related ONUs to enter the normal working state; and the test state of the PON port 2 is unmarked. The unmarking the test state of the PON port 2 of the second LT may be deleting the test state entry with the port information being the port information of the PON port 2 of the second LT and the test state being test started; or may be modifying the test state from test started to test not started in the entry with the port information being the port state of the PON port 2 of the second LT. Optionally, if the first LT starts the test state timer of the PON port 2 of the second LT, the unmarking the test state of the PON port 2 of the second LT further include closing the test state timer of the PON port 2 of the second LT.

(B) It is assumed that the first LT adopts the communication protection manner (2) in step 208.

When an output function of alarm information and/or error information is not masked, the following operations are performed.

The first LT checks whether the PON port 1 of the first LT has the alarm information (such as LOS, LOF, LOSi and LOFi) and/or bit error information during the test of the PON port 2 of the second LT.

If the PON port 1 of the first LT has no alarm information and/or bit error information during the test of the PON port 2 of the second LT, the test state of the PON port 2 of the second LT is unmarked.

If the PON port 1 of the first LT has the alarm information (such as LOS, LOF, LOSi and LOFi) and/or error information during the test of the PON port 2 of the second LT, when the output function of the alarm information and/or bit error information is not masked, the first LT notifies a management system that the alarm information or bit error information is caused by the test of the PON port 2 of the second LT, and sends a notification message to each ONU through the PON port 1, where the notification message instructs the related ONUs to enter the normal working state; and the test state of the PON port 2 of the second LT is unmarked.

When the output function of the alarm information and/or error information is not masked, the following operations are performed.

The first LT checks whether the PON port 1 of the first LT has the alarm information (such as LOS, LOF, LOSi and LOFi) and/or bit error information during the test of the PON port 2 of the second LT. If the PON port 1 of the first LT has no alarm information (such as LOS, LOF, LOSi and LOFi) and/or bit error information during the test of the PON port 2 of the second LT, the output function of the alarm information and bit error information of the PON port 1 of the first LT is restored, and the test state of the PON port 2 of the second LT is unmarked. If the PON port 1 of the first LT has the alarm information (such as LOS, LOF, LOSi and LOFi) and/or error information during the test of the PON port 2 of the second LT, related alarm information or error information is cleared; the output function of the alarm information and error information is restored; the notification message is sent to each ONU through the PON port 1 to instruct the related ONUs to enter the normal working state; and the test state of the PON port 2 of the second LT is unmarked.

The message for notifying each ONU to enter the normal working state may adopt a direct POPUP message in a GPON system, and may adopt a GATE message in an EPON system. For a message format of the direct POPUP message, references may be made to a definition in an ITU-T G.984 standard; and for a message format of the GATE message, references may be made to a definition in an IEEE 802.3ah standard.

Optionally, the first LT may also perform the communication restoration processing when the test state timer times out, and the test state of the PON port 2 of the second LT is unmarked. The specific communication restoration processing is the same as the previous description, and details thereof are not described here again.

Optionally, if in step 208, the policy that the first LT makes for the PON port 2 of the second LT is group test, the first LT performs communication restoration processing and services on each ONU when the first level timer times out, and re-performs the communication protection and starts the first level timer when next single group test of the PON port 2 of the second LT arrives. The cycle repeats until the PON port 2 of the second LT completes all group tests or the second level timer times out. The communication protection and communication restoration processing are the same as the previous description, and details thereof are not described here again.

The method for detecting the passive optical network provided in the embodiment of the present invention is capable of implementing the passive optical network detection in the Type B protection solution. When the standby LT is adopted for the passive optical network detection, the active LT performs the communication protection. After the standby LT finishes the detection, the active LT performs the communication restoration. In this way, the ONU disconnection is avoided during a test of the standby LT, so that the active LT can quickly restore services after the standby LT finishes the test. In addition, unnecessary alarm messages are masked, which not only improves customer satisfaction, but also facilitates network maintenance.

Figure 4:
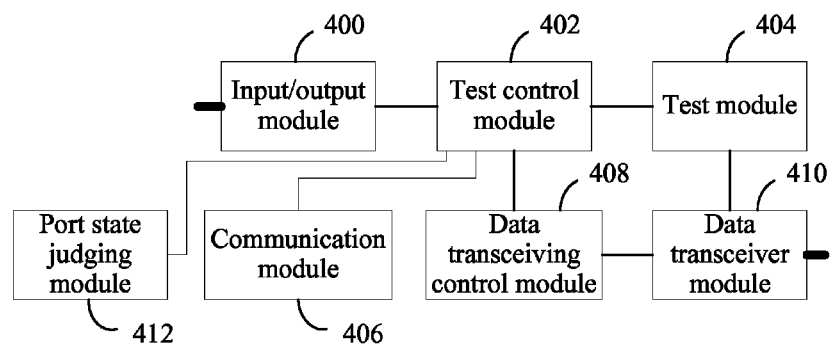
FIG. 4 is a schematic structure diagram of a line terminal according to an embodiment of the present invention.

An embodiment of the present invention provides a line terminal, LT, where the provided LT may serve as the active LT (the first LT) in the Type B protection solution, and may also serve as the standby LT (the second LT) in the Type B protection solution. As shown in FIG. 4, the LT includes the following.

An input/output module 400, set with a network side PON port, is configured to receive a command message for starting passive optical network detection and send the command message to a test control module 402 after receiving the command message. The command message may include port information (for example, a block number, a slot number or a port number) of a port to be detected, a test pulse width, a measuring range and detection time.

The input/output module 400 is further configured to output a test result from the test control module 402 to a network management system.

The test control module 402 is configured to control a test module 404 to perform an OTDR or OFDR test according to the command massage for starting passive optical network detection of the input/output module 400, and send the test result to the input/output module 400.

The test control module 402 is further configured to notify the port state judging module 412 to judge a state of a user side PON port on the LT. When the port state judging module 412 judges that the user side PON port on the LT is a standby PON port, the test control module 402 notifies the communication module 406 to send a request message for starting the passive optical network detection to an active LT in the Type B protection solution.

The port state judging module 412 is configured to judge the state of the user side PON port on the LT. A judging result includes, but is not limited to, whether the user side PON port working under the Type B protection scenario and/or on the LT is an active PON port or a standby PON port.

The test module 404 is configured to receive the command message for starting the passive optical network detection from the test control module 402, and perform the OTDR or OFDR test according to the command message.

The test module 404 may share a transmitter with a data transceiver module 410, and send a test signal to an optical fiber link through the data transceiver module 410. Features and a sending manner of the test signal have been described in Embodiment 1.

The test module 404 is further configured to detect a reflected and/or scattered optical signal of the test signal, and may determine a parameter of an optical fiber line according to a parameter of the transmitted test signal and the detected reflected/scattered signal. For example, a length of the optical fiber line may be determined according to a time difference between the transmitted test signal and the detected reflected/scattered signal; and an OTDR test curve (when the first LT performs the OTDR test) or OFDR test curve (when the first LT performs an OFDR test) may be obtained after processing the transmitted test signal and the detected reflected/scattered signal, thereby obtaining state assessment information of the optical fiber line.

Here, the processing, by the test module 404, the transmitted test signal and the detected reflected/scattered signal may include: directly performing average computing on the reflected/scattered signal detected in multiple times to eliminate noise interference and improve a signal-to-noise ratio; or performing correlation computing and then average computing on the transmitted test signal and the detected reflected/scattered signal to eliminate interference of the transmitted test signal on the reflected/scattered signal and improve the signal-to-noise ratio; or first performing average computing on the reflected/scattered signal detected in multiple times, and then performing correlation computing on the reflected/scattered signal and the transmitted test signal to improve the signal-to-noise ratio.

The data transceiving control module 408 is configured to control the data transceiver module 410 to send and receive data, and may also control, together with the test module 404, the data transceiver module 410 to send the test signal.

When the LT provided in this embodiment is used as the active LT under the Type B protection solution, and the standby LT is used to perform the passive optical network detection, the following configuration is implemented.

The communication module 406 is configured to receive a request message for starting passive optical network detection from the standby LT, notify the data transceiving control module 408 to perform communication protection, and send a response message to the standby LT after the data transceiving control module 408 completes the communication protection. The content of the response message has been described in Embodiment 2.

The communication module 406 is further configured to notify the data transceiving control module 408 to perform communication restoration after receiving a notification message indicating that the test ends from the standby LT.

The data transceiving control module 408 is configured to mark a test state of a user side PON port of the standby LT after receiving an instruction of performing data protection from the communication module 406, and may also be configured to suspend an output function of alarm information (such as LOS, LOF, LOSi and LOFi) and/or bit error information and control the data transceiver module 410 to suspend communication with an ONU/ONT.

A method for marking the test state has been described in Embodiment 1, and details thereof are not described here again.

The data transceiving control module 408 is further configured to unmark the test state of the user side PON port of the standby LT after receiving an instruction of performing the communication restoration from the communication module 406, restore the output function of the alarm information (such as LOS, LOF, LOSi and LOFi) and/or bit error information and control the data transceiver module 410 to restore communication with the ONU/ONT.

The LT provided in this embodiment implements the optical distribution network detection under the Type B protection solution by sharing the transmitter of the data transceiver module. When the LT provided in this embodiment is used as the active LT, and the standby LT is used to detect the optical distribution network, the LT provided in this embodiment may perform the communication protection well. After the test ends, the LT provided in this embodiment may perform the communication restoration, which does not affect normal services of the active LT, improves user satisfaction, and facilitates network maintenance.

Figure 5:
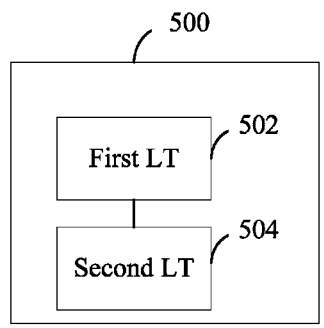
FIG. 5 is a schematic structure diagram of a passive optical network central office system according to an embodiment of the present invention.

An embodiment of the present invention provides a passive optical network central office system. As shown in FIG. 5, the provided passive optical network central office system 500 includes a first LT 502 and a second LT 504. A first PON port is disposed on the first LT 502, and a second PON port is disposed on the second LT 504.

The first LT 502 is configured to receive a request message for starting detection from the second LT 504, send a message of starting detection to the second LT 504, perform communication protection on communication established between the first PON port and an optical network unit when the second LT 504 tests the second PON port, receive a message indicating that the test ends sent by the second LT 504, and release the communication protection performed during the test.

The second LT 504 is configured to send the request message for starting detection to the first LT 502, detect the second PON port after receiving the message of starting detection, and send the message indicating that the test ends to the first LT 502 after the detection ends.

The performing, by the second LT 504, detection on the second PON port is specifically as follows. The second LT 504 sends a test signal or sends an optical signal bearing the test signal to an optical distribution network connected to the second LT 504 according to the response message, receives the test signal or a reflected and/or scattered optical signal of the optical signal bearing the test signal, performs time domain or frequency domain analysis on the reflected and/or scattered optical signal, and obtains line state assessment information of the optical distribution network.

Figure 6:
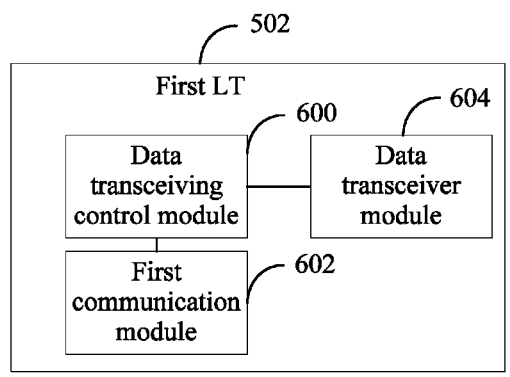
FIG. 6 is a schematic structure diagram of a first line terminal according to an embodiment of the present invention.

Specifically, the first LT 502 may include a data transceiving control module 600, a first communication module 602 and a data transceiver module 604, as shown in FIG. 6.

The first communication module 602 is configured to receive the request message, instruct the data transceiving control module 600 to perform communication protection according to the request message, and send the response message to the second LT 504.

The data transceiver module 604 is configured to communicate with terminal equipment such as an ONU/ONT under the control of the data transceiving control module 600, and is disposed with the PON port 1.

The data transceiving control module 600 is configured to perform communication protection, where the communication protection manner includes one or more of the following types: the first LT marks a test state of the PON port 2 of the second LT.

(1) The data transceiving control module 600 marks the test state of the PON port 2 of the second LT 504, controls the data transceiver module 604 to continue communication with the ONU before the test of the second LT 504 ends, and temporarily does not perform other operations.

(2) The data transceiving control module 600 marks the test state of the PON port 2 of the second LT 504 to obtain a test state mark of the PON port 2 of the second LT 504, controls the data transceiver module 604 to continue communication with the ONU before the test of the second LT 504 ends, and suspends an output function of alarm information, such as a loss of signal (LOS) alarm of the PON port, a loss of frame (LOF) alarm of the PON port, a loss of signal alarm of an ONUi (LOSi) and a loss of frame alarm of the ONUi (LOFi)) and/or bit error information of the data transceiver module 604.

(3) The data transceiving control module 600 marks the test state of the PON port 2 of the second LT 504, and controls the data transceiver module 604 to suspend communication with the ONU before the test of the second LT 504 ends.

The method for marking the test state of the PON port 2 of the second LT 504 has been described in Embodiment 1, and details thereof are not described here again.

The data transceiving control module 600 is further configured to determine a test policy of the second LT 504 according to a detection parameter in the request message. As for a process for the data transceiving control module 600 to make the test policy, references may be made to Embodiment 1.

The first communication module 602 is further configured to receive an indication message indicating that the test ends from the second LT 504, and check whether a test state mark of the PON port 2 of the second LT 504 exists after receiving the indication message. If the test state mark exists, the first communication module 602 ignores the indication message; and if the test state mark does not exist, the first communication module 602 instructs the data transceiving control module 600 to perform communication restoration.

The checking, by the first communication module 602, whether the test state mark of the PON port 2 of the second LT 504 exists may be checking whether marked port information being port information of the PON port 1 of the data transceiver module 604, marked port information being port information of the PON port 2 of the second LT 504, a test state being a test started state and/or a test state timer being in a start state exists. If the marked port information being the port information of the PON port 1 of the data transceiver module 604, the marked port information being the port information of the PON port 2 of the second LT 504, the test state being the test started state and/or the test state timer being in the start state exists, it is considered that the test state mark of the PON port 2 of the second LT 504 exists. If the marked port information being the port information of the PON port 1 of the data transceiver module 604, the marked port information being the port information of the PON port 2 of the second LT 504, the test state being the test started state and/or the test state timer being in the start state does not exist, it is considered that the test state mark of the PON port 2 of the second LT 504 does not exist.

The performing, by the data transceiving control module 600, communication restoration processing includes:

The data transceiving control module 600 controls the data transceiver module 604 to send a notification message to the ONUs 140 and 142 through the PON port 1, where the notification message instructs the related ONUs to enter a normal working state.

Optionally, before controlling the data transceiver module 604 to send the notification message to the ONUs 140 and 142, the data transceiving control module 600 may further perform the following operations.

(A) If the data transceiving control module 600 adopts the manner (1) for communication protection, the data transceiving control module 600 checks whether the PON port 1 has the alarm information (such as LOS, LOF, LOSi and LOFi) and/or bit error information during the test of the PON port 2 of the second LT 504. If the PON port 1 has no alarm information (such as LOS, LOF, LOSi and LOFi) and/or error information during the test of the PON port 2 of the second LT 504, the data transceiving control module 600 unmarks the test state of the PON port 2 of the second LT 504. If the PON port 1 has the alarm information (such as LOS, LOF, LOSi and LOFi) and/or error information during the test of the PON port 2 of the second LT 504, the data transceiving control module 600 notifies a management system of that the alarm information or error information is caused by the test of the PON port 2 of the second LT, sends the notification message through the PON port 1 to each ONU, where the notification message instructs the related ONUs to enter the normal operation state, and unmarks the test state of the PON port 2 of the second LT 504.

(B) If the data transceiving control module 600 adopts the manner (2) for communication protection, the data transceiving control module 600 checks whether the PON port 1 has the alarm information (such as LOS, LOF, LOSi and LOFi) and/or bit error information during the test of the PON port 2 of the second LT. If the PON port 1 has no alarm information (such as LOS, LOF, LOSi and LOFi) and/or bit error information during the test of the PON port 2 of the second LT, the data transceiving control module 600 restores the output function of the alarm information and error information of the PON port 1, and unmarks the test state of the PON port 2 of the second LT 504. If the PON port 1 has the alarm information (such as LOS, LOF, LOSi and LOFi) and/or bit error information during the test of the PON port 2 of the second LT, the data transceiving control module 600 clears related alarm information or bit error information, restores the output function of the alarm information and bit error information, and send the notification message to each ONU through the PON port 1 to instruct related ONUs to enter the normal working state, and unmarks the test state of the PON port 2 of the second LT 504.

(C) If the data transceiving control module 600 adopts the manner (3) for communication protection, the data transceiving control module 600 restores a data sending function of the PON port 1, sends the notification message to each ONU through the PON port 1, where the notification message instructs the related ONUs to enter the normal working state, and unmarks the test state of the PON port 2 of the second LT 504.

Optionally, the data transceiving control module 600 may also perform the communication restoration processing when the test state timer times out, and unmark the test state of the PON port 2 of the second LT 504.

Figure 7:
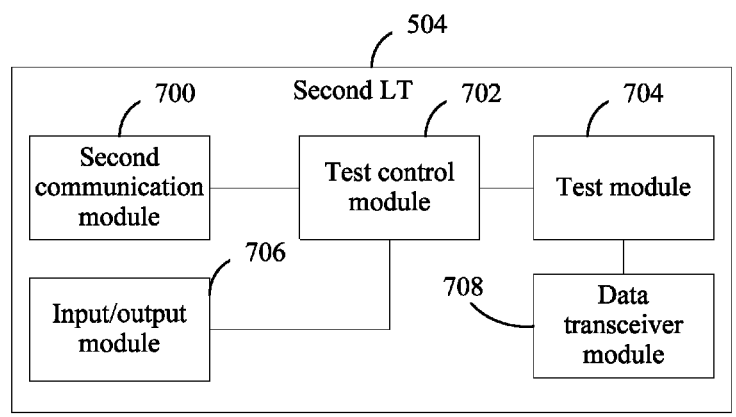
FIG. 7 is a schematic structure diagram of a second line terminal according to an embodiment of the present invention.

The second LT 504 may include a second communication module 700, a test control module 702, a test module 704, an input/output module 706 and a data transceiver module 708, as shown in FIG. 7.

The input/output module 706 is configured to receive a command message from a network management system, and send the command message to the test control module 702.

The test control module 702 is configured to control the second communication module 700 to send a request message for starting passive optical network detection to the first LT 502 according to the command message, control the test module 704 to detect the optical distribution network connected to the second LT 504 after receiving a response message from the second communication module 700, receive line state assessment information from the test module 704, and send the line state assessment information to the input/output module 706.

The second communication module 700 is configured to send a request message to the first LT 502, receive a response message from the first LT 502, and send the response message to the test control module 702.

The test module 704 is configured to control the data transceiver module 708 to send a test signal or send an optical signal bearing the test signal, receive the test signal or a reflected and/or scattered optical signal of the optical signal bearing the test signal, perform time domain or frequency domain analysis on the reflected and/or scattered optical signal to obtain the line state assessment information of the optical distribution network, and send the line state assessment information to the test control module 702.

The data transceiver module 708 is configured to send the test signal or send the optical signal bearing the test signal.

The PON central office system 500 provided in the embodiment of the present invention may be an OLT, where the first LT 502 and the second LT 504 may be connected through an internal interface, and messages between the LTs may be borne in a pre-defined internal message. The passive optical network central office system 500 may also be a system including at least two OLTs. The first LT 502 and the second LT 504 may be set on different OLTs. Messages between the first LT 502 and the second LT 504 may be borne in messages such as an OAM message and a layer 2 control (Layer 2 Control, L2C) message.

The passive optical network central office system provided in the embodiment may work under the Type B protection scenario. When the standby LT is adopted to perform optical distribution network detection, the active LT is capable of performing the communication protection and communication restoration without affecting normal services of the active LT, which avoids the OUN disconnection or services interruption due to the test, thereby ensuring customer satisfaction while improving network maintenance. Furthermore, unnecessary alarm messages are masked, user satisfaction is improved, and it is also convenient for network maintenance.

Figure 8:
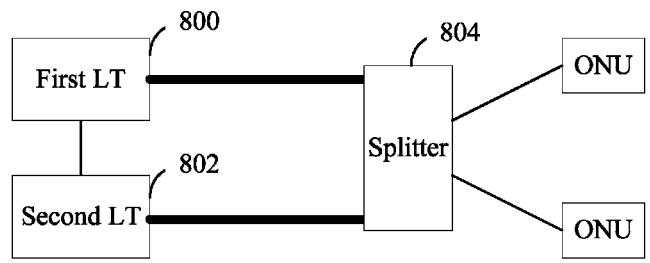
FIG. 8 is a schematic diagram of a system according to an embodiment of the present invention.

An embodiment of the present invention provides a communication system. As shown in FIG. 8, the communication system includes a passive optical network central office system, a splitter, Splitter 804, and user terminal equipment. In this embodiment, the user terminal equipment is an ONU.

The passive optical network central office system includes a first LT 800 and a second LT 802 that back up each other.

The second LT 802 is configured to send a request message for starting passive optical network detection to the first LT 800, send a test signal or send an optical signal bearing the test signal to an optical distribution network connected to the second LT 802 after receiving a response message from the first LT 800, receive the test signal or a reflected and/or scattered optical signal of the optical signal bearing the test signal, and perform time domain or frequency domain analysis on the reflected and/or scattered optical signal to obtain line state assessment information of the optical distribution network.

The second LT 802 is further configured to receive a command message for starting passive optical network detection from a network management system.

The first LT 800 is configured to perform communication protection on the optical distribution network according to the request message, and send a response message to the second LT 802. Communication protection manners and content of the response message have been described in Embodiment 1, and details thereof are not described here again.

The first LT 800 is further configured to receive a notification message indicating that the test ends from the second LT 802, and perform communication restoration after receiving the notification massage. Communication restoration manners are corresponding to the communication protection manners, which have been described in Embodiment 1, and details thereof are not described here again.

The communication system provided in this embodiment may notify an active LT to perform the communication protection when a standby LT is used to detect the optical distribution network, and notify the active LT to perform the communication restoration after the detection ends. In this way, normal services are not affected, and the user terminal equipment disconnection is avoided, thereby improving user satisfaction. In addition, the user terminal equipment is also prevented from producing a great deal of alarm information and bit error information due to interference.

In the above test solution, one of the LTs is used to calculate a test policy and the test policy is delivered to another LT for test. Since the Type B protection solution merely protects a PON port corresponding to the first LT, the ONU disconnection may occur when the second LT is started for the test. In addition, another cause also leads to the ONU disconnection, that is, if test pulses are sent directly, usually tens of thousands of test pulses need to be sent, which also causes that each ONU is incapable of receiving communication data sent by an OLT during the test and is thereby disconnected. However, it takes a long time for the ONU to re-establish a connection, and normal transmission of services is affected.

To solve the problem, the present invention designs a method for controlling a test of an integrated OTDR or OFDR, which controls that an ONU can periodically receive communication data sent by an OLT during a signal test of the OTDR or OFDR, thereby ensuring that the ONU is not disconnected during the test of the OTDR or OFDR. The technical solutions in the embodiments of the present invention are clearly and fully described in the following with reference to the accompanying drawings. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 9:
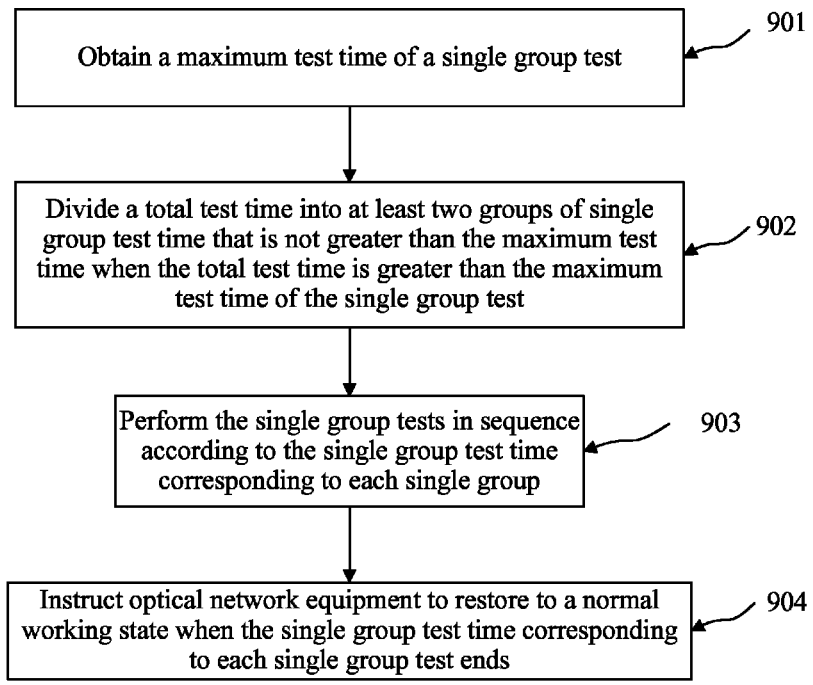
FIG. 9 is a flow chart of a method for testing an optical network according to Embodiment 1 of the present invention.

An embodiment of the present invention provides a method for testing an optical network, applicable to an integrated optical time domain reflectometer or optical frequency domain reflectometer, which includes, but is not limited to, a situation of integrating an optical time domain reflectometer or an optical frequency domain reflectometer in optical central office equipment (such as an OLT). As shown in FIG. 9, the method for testing an optical network specifically includes the following.

Step 901: Obtain a maximum test time of a single group test, where the maximum test time of the single group test according to this embodiment is as follows: if a continuous test time of a group of tests is within the maximum test time, optical terminal equipment (such as an ONU or an ONT) does not restore to an initial state; and if the continuous test time of a group of tests exceeds the maximum test time, the optical terminal equipment restores to the initial state.

Step 902: When a total test time is greater than the maximum test time of the single group test, if tests of the total test time are completed in one group of tests, the optical terminal equipment definitely restores to the initial state; therefore, in this embodiment of the present invention, the total test time is divided into multiple groups of time, and each single group test time cannot be greater than the maximum test time.

Step 903: Perform the single group tests in sequence according to the single group test time corresponding to each single group, where in this embodiment of the present invention, the single group test time of each single group test is pre-determined, and it is ensured that a continuous time of each group of tests does not exceed the maximum test time of the single group test, so as to avoid that the optical terminal equipment restores to the initial state.

Step 904: When the single group test time of each single group test ends, instruct the optical network equipment to restore to a normal working state, so that the optical network equipment performs corresponding data processing, where in this embodiment of the present invention, the optical network equipment is the above optical terminal equipment, such as an ONU or an ONT.

Figure 10:
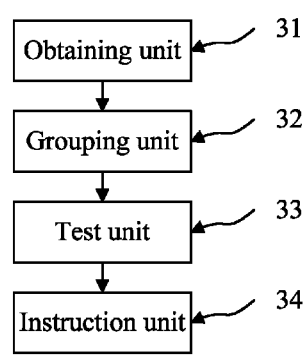
FIG. 10 is a block diagram of an apparatus for testing an optical network according to Embodiment 1 of the present invention.

An embodiment of the present invention further provides an apparatus for testing an optical network, which includes, but is not limited to, a situation of integrating an optical time domain reflectometer in optical central office equipment (such as an OLT). As shown in FIG. 10, the apparatus for testing an optical network includes: an obtaining unit 31, a grouping unit 32, a test unit 33 and an instruction unit 34.

The obtaining unit 31 is configured to obtain a maximum test time of a single group test; and if a continuous test time of a group of tests is within the maximum test time, optical terminal equipment does not restore to an initial state. The grouping unit 32 is configured to divide a total test time into at least two groups of single group test time that is not greater than the maximum test time when the total test time is greater than the maximum test time of the single group test time, so as to ensure that the continuous test time of each single group test does not exceed the maximum test time. The test unit 33 is configured to perform the single group tests in sequence according to a single group test time corresponding to each single group test. The instruction unit 34 is configured to instruct the optical network equipment to restore to a normal working state when the single group test time corresponding to each single group test ends, so that the optical network equipment performs corresponding data processing.

In practical applications, if other optical network equipment apart from optical terminal equipment such as an ONU or an ONT may also restore to the initial state when a test time is too long, a group test solution provided in the embodiment of the present invention may also be adopted to instruct the optical network equipment to restore to the normal working state after each group test ends.

The method and apparatus for testing an optical network according to the embodiment of the present invention are applicable to an integrated optical time domain reflectometer or optical frequency domain reflectometer. For example, the integrating an optical time domain reflectometer or optical frequency domain reflectometer in central office equipment such as an OLT may adopt the method and apparatus for testing an optical network provided in the embodiments of the present invention. In the embodiment of the present invention, the maximum test time of the single group test needs to be obtained, and when the total test time is greater than the maximum test time of the single group test, the total test time is divided into at least two groups of single group test time that is not greater than the maximum test time, so as to ensure that the duration of each single group test does not exceed the maximum test time of the single group test. Therefore, the optical network equipment does not restore to an initial state, which saves time of re-registration and re-ranging of the optical network equipment. In this way, the optical network equipment may not be disconnected due to the optical network test, thereby ensuring normal operation of services in the optical network, decreasing system processing complexity while reducing the influence of the optical network test on communication, and improving customer satisfaction.

Embodiment 2

Figure 11A:
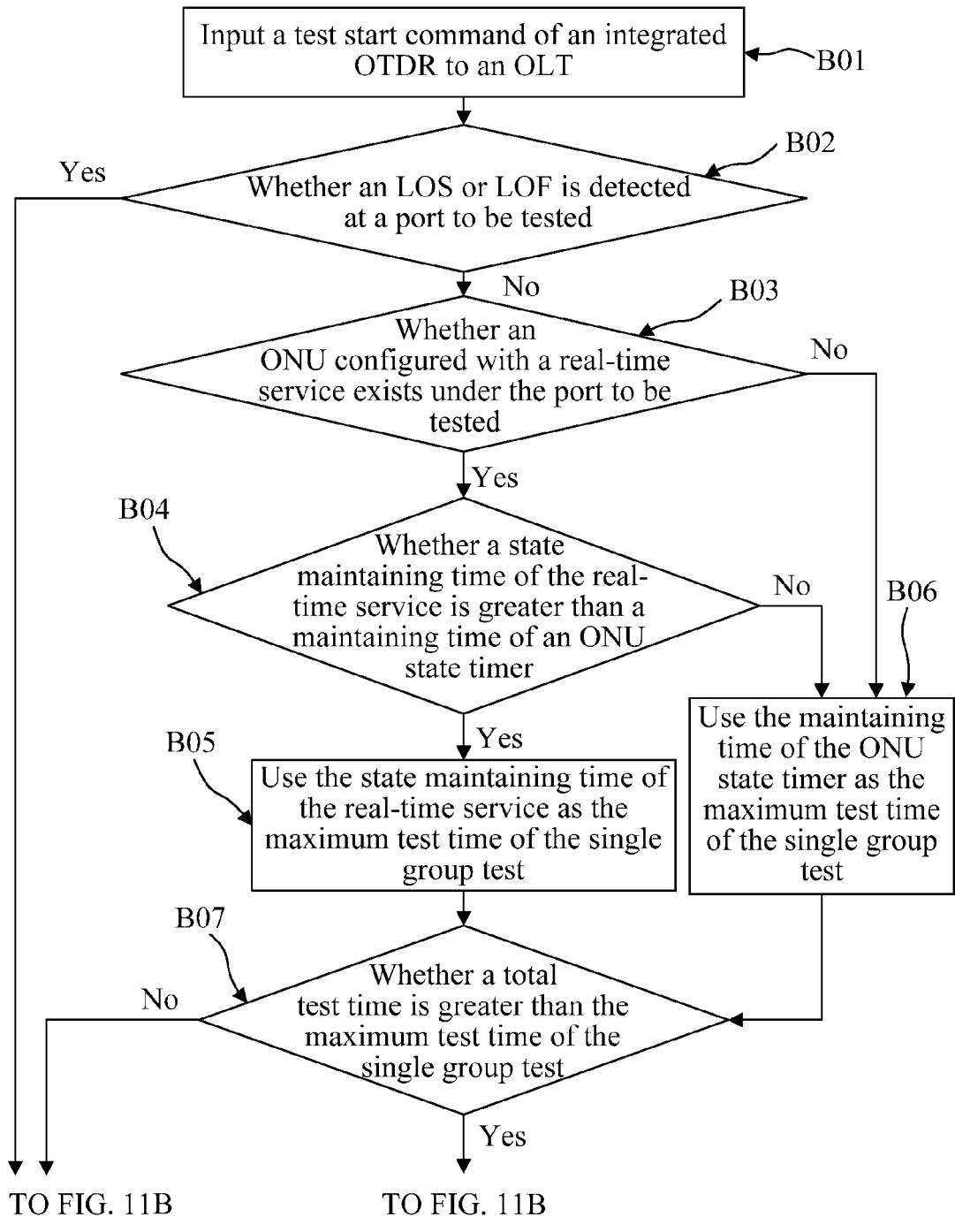
FIG. 11A and FIG. 11B are a flow chart of a method for testing an optical network according to Embodiment 2 of the present invention.
Figure 11B:
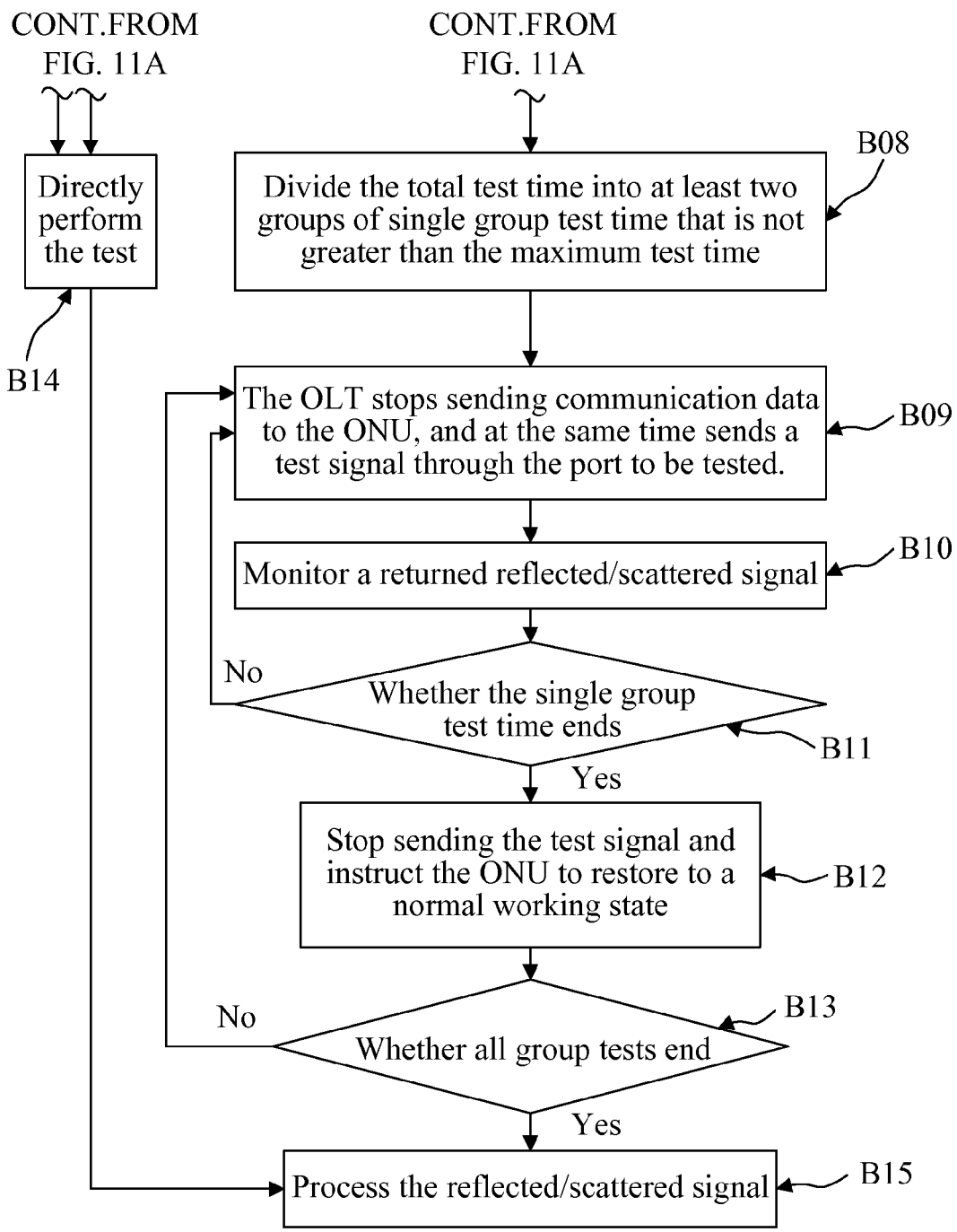

It is taken as an example in this embodiment that an OTDR or OFDR is integrated in an OLT and a user side interface is provided for a user through an ONU to illustrate a method for testing an optical network applicable to an integrated OTDR or OFDR provided in the embodiment of the present invention. As shown in FIG. 11A and FIG. 11B, the method specifically includes the following.

Step B01: An OLT receives a command message for starting passive optical network monitoring.

The command message may be delivered to the OLT by a network management system through a SNMP protocol, or may be input by maintenance personnel on the OLT through a command line, and may also be triggered by an internal timer of the OLT.

The command message may include port information of a port to be monitored, a test type, a total test time, a test pulse width and a measuring range. The port information of a port to be tested may include a block number, a slot number and a port number of the port, and the test type may be a periodic test or a manually started test.

Step B02: After receiving the command message of starting the passive optical network monitoring, optionally, the OLT may first judge whether an LOS (Loss of Signal, loss of signal) alarm or LOF (Loss of Frame, loss of frame) alarm is monitored at the port to be tested; if the LOS or LOF alarm is monitored, it indicates that all ONUs under the port to be tested are disconnected, and a problem of preventing the ONUs from restoring to an initial state during the test does not need to be considered, and step B14 is performed; and if the LOS or LOF alarm is not monitored, it indicates that some ONUs under the port to be tested are still connected, and step B03 is performed.

Step B03: Judge whether an ONU configured with a real-time service exists under the port to be tested; if no ONU configured with the real-time service exists, perform step B06; and if an ONU configured with the real-time service exists, perform step B04.

Step B04: Compare a state maintaining time of the real-time service and a maintaining time of an ONU state timer; if the state maintaining time of the real-time service is greater than the maintaining time of the ONU state timer, perform step B05; and if the state maintaining time of the real-time service is not greater than the maintaining time of the ONU state timer, perform step B06.

Step B05: Use the state maintaining time of the real-time service as the maximum test time of the single group test, and perform step B07.

The real-time service includes, but is not limited to, a TDM (Time Division Multiplexing, time division multiplexing) private line service, and a VOIP (Voice over Internet Protocol, voice over internet protocol) voice service.

In average case, the real-time service not only requires establishment of a data channel for data transmission, but also requires establishment of a control channel for signaling interaction. However, the control channel generally requires information interaction between a server and a client, so as to maintain a state. Once the server and the client have no information interaction for a long time, the control channel will be removed, and the data channel will also become invalid, thereby interrupting the real-time service. For example, a state maintaining time of the time division multiplexing (TDM, Time Division Multiplexing) service of the real-time service is generally 50 ms.

Step B06: Use a maintaining time of the ONU state timer as the maximum test time of the single group test, and perform step B07. A recommended value of the maintaining time of the ONU state timer in a G984.3 standard is 100 ms, and a recommended value thereof in an Ethernet passive optical network (EPON, Ethernet Passive Optical Network) standard is 200 ms.

Step B07: Judge whether the total test time of the test of the integrated OTDR or OFDR is greater than the maximum test time of the single group test; if the total test time is not greater than the maximum test time of the single group test, perform step B14; and if the total test time is greater than the maximum test time of the single group test, perform step B08.

Step B08: Divide the total test time into at least two groups of single group test time that is not greater than the maximum test time, and a dividing manner may be, but is not limited to, the following two grouping manners.

In the first grouping manner, the total test time is divided by the maximum test time of the single group test, and a result thereof is rounded up to obtain the number of groups; and the total test time is divided by the number of groups to obtain the single group test time corresponding to each group. Each single group test time obtained in this manner is the same, and does not exceed the maximum test time.

In the second grouping manner, the total test time is divided by the maximum test time, and a result thereof is rounded down to obtain the number of groups with the single group test time being the maximum test time; and the total test time is subtracted by a product of the maximum test time and the number of groups with the single group test time being the maximum test time, to obtain the single group test time of one group. If the total test time needs to be divided into N groups, the single group test time of (N−1) groups obtained in this manner is definitely equal to the maximum test time, and the single group test time of the remaining group is smaller than or equal to the maximum test time.

Step B09: The OLT triggers a TC layer state machine of the ONU to enter a POPUP state from a normal working state, and then sends a test signal through the port to be tested, and records a moment when the test signal is transmitted.

A process of the OLT triggering the TC layer state machine of the ONU to enter the POPUP state from the normal working state may be as follows. The OLT does not send any data to the ONU during four continuous frames; the ONU produces an LOS alarm due to incapability of monitoring an optical signal in four continuous frames, and transfers the TC layer state machine from the normal working state to the POPUP state. The process of the OLT triggering the TC layer state machine of the ONU to enter the POPUP state from the normal working state may also be as follows. The OLT does not send any data to the ONU during first two frames, and then sends the test signal or other data not meeting a GPON or a EPON protocol; the ONU produces an LOF alarm due to incapability of monitoring data meeting the protocol in four continuous frames, and transfers the TC layer state machine from the normal working state to the POPUP state.

The test signal may be a single period test pulse, and a width of the test pulse may be set according to the pulse width specified in the test command. The test signal may also be a particular test sequence, for example, simulating a Golay complementary sequence by sending four sequences. A code element width of the Golay complementary sequence may be set according to the pulse width specified in the test command. The Golay complementary sequence may be pre-configured. The test signal may also be a pseudo random sequence, and a code element width of the pseudo random sequence may be set according to the pulse width specified in the test command. The test signal may also be an OFDM (Orthogonal Frequency Division Multiplex, orthogonal frequency division multiple) sequence.

Step B10: The OLT integrated with the OTDR or OFDR monitors a returned reflected/scattered signal, and determines a parameter of an optical fiber line according to the sent test signal and the monitored reflected/scattered signal. For example, a length of the optical fiber line is determined according to a time difference between the transmitted test signal and the monitored reflected/scattered signal; and the transmitted test signal and the monitored reflected/scattered signal are processed to obtain an OTDR or OFDR test curve, thereby obtaining state assessment information of the optical fiber line.

The processing the transmitted test signal and the monitored reflected/scattered signal may include the following. If the sent test signal is a single test pulse, average computing may be directly performed on the reflected/scattered signal monitored in multiple times, so as to eliminate noise interference and improve a signal-to-noise ratio of a final test curve. If the sent test signal is the Golay complementary sequence or pseudo random sequence, correlation computing and then average computing may be performed on the transmitted test signal and the monitored reflected/scattered signal, so as to eliminate the noise interference and improve the signal-to-noise ratio of the final test curve; or, average computing is performed on the reflected/scattered signal monitored in multiple times and then correlation computing is performed on the reflected/scattered signal and the transmitted test signal, so as to eliminate the noise interference and improve the signal-to-noise ratio of the final test curve; or, average computing is performed on the reflected/scattered signal monitored in multiple times, then the reflected/scattered signal is buffered, and after all group tests are completed, correlation computing is performed on the buffered reflected/scattered signal and the transmitted test signal, so as to eliminate the noise interference and improve the signal-to-noise ratio of the final test curve.

To facilitate analysis and processing of the reflected/scattered signal, an embodiment of the present invention may perform pre-processing such as photoelectric conversion, amplification and analogue-to-digital conversion on the reflected/scattered signal.

Step B11: Judge whether the single group test time corresponding to a group being tested ends; if the single group test time corresponding to the group being tested does not end, return to step B09; and if the single group test time corresponding to the group being tested ends, perform step B12.

Step B12: Stop sending the test signal, and instruct the ONU to restore to the normal working state; and specifically, a message may be sent to notify the ONU to enter the normal working state. For example, in a gigabit passive optical network (GPON, Gigabit Passive Optical Network) system, a Direct POPUP message may be respectively sent to each ONU to notify each ONU to enter the normal working state; while in an EPON system, a GATE message may be sent to each ONU to notify the ONU to enter the normal working state. In addition, a message may be re-defined and broadcasted to all ONUs under the port to be tested, thereby notifying all the ONUs under the port to be tested to enter the normal working state.

After the ONUs restore to the normal working state, the OLT may distribute bandwidth to each ONU according to a service type and a bandwidth request of each ONU, so that the ONU performs the real-time service.

After the ONUs restore to the normal working state, the OLT should preferentially process a service with a high priority in the ONU, for example, the real-time service, and performs next single group test after the service with a high priority is processed. According to the solution in this embodiment, step B13 is performed after the service with a high priority is processed.

Step B13: Judge whether tests of all groups end; if the tests of all the groups do not end, perform step B09 according to next single group test time; and if the tests of all the groups end, perform step B15.

A specific judging manner may be, but is not limited to, the following manner: setting a counter with an initial value of zero, where a value of the counter is added by 1 after each group of tests; if the value of the counter reaches the number of groups, it indicates that the tests of all the groups end; and if the value of the counter does not reach the number of groups, it indicates that the tests of all the groups do not end.

Step B14: Directly perform tests, where the tests do not need to be divided into groups, and the tests merely need to be performed according to the total test time. The OLT sends the test signal through the port to be tested, records the moment when the test signal is transmitted, and monitors the returned reflected/scattered signal.

The test signal may be a single period test pulse, and a width of the test pulse may be set according to the pulse width specified in the test command. The test signal may also be a particular test sequence, for example, simulating a Golay complementary sequence by sending four sequences. A code element width of the Golay complementary sequence may be set according to the pulse width specified in the test command. The Golay complementary sequence may be pre-configured. The test signal may also be a pseudo random sequence, and a code element width of the pseudo random sequence may be set according to the pulse width specified in the test command. The test signal may also be an OFDM (Orthogonal Frequency Division Multiplex, orthogonal frequency division multiple) sequence.

Step B15: Process the reflected/scattered signal, and determine the parameter of the optical fiber line according to the transmitted test signal and the monitored reflected signal. For example, a transmission distance of the reflected signal on an optical fiber is determined according to the time difference between the transmitted test signal and the monitored reflected/scattered signal; and the transmitted test signal and the monitored reflected/scattered signal are processed to obtain the OTDR or OFDR test curve, thereby obtaining the state assessment information of the optical fiber line.

The processing of the transmitted test signal and the monitored reflected/scattered signal may include the following operations. If the sent test signal is a single test pulse, average computing may be directly performed on the reflected/scattered signal monitored in multiple times, so as to eliminate noise interference and improve a signal-to-noise ratio of a final test curve. If the sent test signal is the Golay complementary sequence or pseudo random sequence, correlation computing and then average computing may be performed on the transmitted test signal and the monitored reflected/scattered signal, to eliminate the noise interference and improve the signal-to-noise ratio of the final test curve; or, average computing is performed on the reflected/scattered signal monitored in multiple times and then correlation computing is performed on the reflected/scattered signal and the transmitted test signal, so as to eliminate the noise interference and improve the signal-to-noise ratio of the final test curve.

In the above embodiment, the OLT judges whether the port to be tested monitors the LOS/LOF alarm after receiving a start command. In practical applications, this step may be omitted, and the OLT may directly perform the process of step B03 after receiving the start command.

Optionally, if the test type in the start command is the periodic test, the solution described in FIG. 11A and FIG. 11B may be adopted for the test; while if the test type in the start command is the manually started test, the above group test solution is not adopted, and instead, continuous tests are directly performed to obtain a test result.

Optionally, if a test moment is service rush hours (for example, 7:00 pm to 9:00 pm), tests may be performed according to the solution described in FIG. 11A and FIG. 11B; while if the test moment is not the service rush hours (for example, 3:00 am to 5:00 am), continuous tests may be directly performed to obtain a test result.

In the embodiment described in FIG. 11A and FIG. 11B, the total test time is directly expressed by time, and in practical applications, the total test time may also be expressed by the total number of tests, namely, expressing the total test time by sending the total number of sending times of the test signal and monitoring times of the reflected/scattered signal. For example, each test duration may be determined according to a measuring arrange of an optical fiber to be tested. Since the time of each test is an assessable value, the total test time and the total number of tests may be converted. In average case, a test duration of each test of a 20 km optical fiber is 250 us. If 1000 times of tests are required, a total test time is at least 250 ms.

Since the total test time may be expressed by the total number of tests, the single group test time may also be expressed by the number of single group tests when the group tests are performed. For example, for a 20 km optical fiber, the time for each test should be 250 us, and the number of single group tests is obtained by dividing the single group test time by 250 us. In this way, the number of tests may be counted during each group test. When a counted value reaches the number of single group tests, the ONU is instructed to restore to the normal working state.

In practical applications, if other optical network equipment apart from optical terminal equipment such as an ONU or an ONT may also restore to the initial state when a test time is too long, the group test solution provided in the embodiment of the present invention may also be adopted to instruct the optical network equipment to restore to the normal working state after each group of tests ends.

According to the embodiment of the present invention, detection is performed on the passive optical network, and that the same time, the TC layer state machine of the ONU is protected, which ensures that the optical network equipment does not restore to the initial state during the test, and saves time of re-registration and re-ranging of the optical network equipment. In this way, the optical network equipment may not be disconnected due to the optical network test, thereby ensuring normal operation of services in the optical network, decreasing system processing complexity while reducing the influence of the optical network test on communication, and improving customer satisfaction.

Embodiment 3

Figure 12:
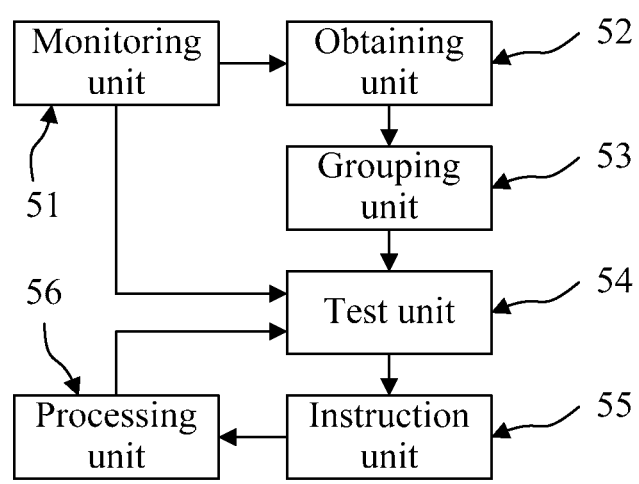
FIG. 12 is a block diagram of an apparatus for testing an optical network according to Embodiment 3 of the present invention.

An embodiment of the present invention further provides an apparatus for testing an optical network, applicable to an integrated optical time domain reflectometer or an integrated optical frequency domain reflectometer, which includes, but is not limited to, a situation of integrating an optical time domain reflectometer or an optical frequency domain reflectometer in optical central office equipment (such as an OLT). As shown in FIG. 12, the apparatus for testing an optical network includes a monitoring unit 51, an obtaining unit 52, a grouping unit 53, a test unit 54, an instruction unit 55 and a processing unit 56.

The monitoring unit 51 is configured to monitor a loss of signal/loss of frame alarm of a port to be detected before obtaining a maximum test time of a single group test. If the LOS or LOF alarm is monitored, it indicates that all ONUs under the port to be tested are disconnected and a problem of preventing the ONUs from restoring to an initial state during the test does not need to be considered, and then the test unit 54 directly performs test. If the LOS/LOF alarm is not monitored, it indicates that some ONUs under the port to be tested are still connected, and then the maximum test time of the single group test is obtained through the obtaining unit 52, so that the test is performed according to a subsequent group test solution.

Specifically, the obtaining unit 52 may adopt the following manners to obtain the maximum test time.

In the first manner, the obtaining unit 52 may use a maintaining time of a state timer in optical network equipment as the maximum test time of the single group test when the optical network equipment is not configured with a real-time service.

In the second manner, the obtaining unit 52 may use a state maintaining time of a real-time service as the maximum test time of the single group test when optical network equipment is configured with the real-time service and the state maintaining time of the real-time service is greater than a maintaining time of a state timer in the optical network equipment.

In the third manner, the obtaining unit 52 may use a maintaining time of a state timer in optical network equipment as the maximum test time of the single group test when the optical network equipment is configured with a real-time service and a state maintaining time of the real-time service is not greater than a maintaining time of the state timer in the optical network equipment.

After the maximum test time is obtained, the test unit 54 directly performs the test when a total test time is not greater than the maximum test time of the single group test. The grouping unit 53 is configured to divide the total test time into at least two groups of single group test time that is not greater than the maximum test time when the total test time is greater than the maximum test time of the single group test, so as to ensure that a continuous test time of each single group test does not exceed the maximum test time. The test unit 54 is configured to perform the single group tests in sequence according to the single group test time corresponding to each single group. The instruction unit 55 is configured to instruct the optical network equipment to restore to a normal working state when the single group test time corresponding to each single group test ends, so that the optical network equipment performs corresponding data processing.

In order to ensure that the OLT can preferentially process a service with a high priority, the processing unit 56 in this embodiment of the present invention is configured to instruct the optical network equipment to preferentially process the service with a high priority after the optical network equipment restores to the normal working state; and the test unit 54 performs the single group tests in sequence according to each single group test time after the service with a high priority is processed.

Grouping manners adopted by the grouping unit 53 in the embodiment of the present invention include, but are not limited to, the following two manners.

In the first grouping manner, the total test time is divided by the maximum test time, and a result thereof is rounded up to obtain the number of groups; and the total test time is divided by the number of groups to obtain the single group test time corresponding to each group. Each single group test time obtained in this manner is the same, and does not exceed the maximum test time.

In the second grouping manner, the total test time is divided by the maximum test time, and a result thereof is rounded down to obtain the number of groups with the single group test time being the maximum test time; and the total test time is subtracted by a product of the maximum test time and the number of groups with the single group test time being the maximum test time, to obtain a single group test time of one group. If the total test time finally needs to be divided into N groups, the single group test time of (N−1) groups obtained in this manner is definitely equal to the maximum test time, and the single group test time of the remaining group is smaller than or equal to the maximum test time.

Optimally, a specific implementation solution of the test unit 54 in the embodiment of the present invention includes: a control module 541, a sending module 542 and a monitoring module 543.

The control module 541 is configured to control stopping sending communication data to an optical fiber. The sending module 542 is configured to cyclically send a test signal when the single group test time corresponding to the single group test does not end. The monitoring module 543 is configured to monitor a returned reflected/scattered signal.

Same as the manner for expressing the total test time and the single group test time in Embodiment 2, in this embodiment of the present invention, the total test time may also be expressed by time directly or expressed by the total number of tests, and the single group test time may also be expressed by time directly or expressed by the number of single group tests. For a specific implementation manner, reference is made to a corresponding part in Embodiment 2, and details thereof are not described here again.

According to the embodiment of the present invention, a state of the ONU is effectively protected during a test of an integrated OTDR, and it is ensured that that the ONU may quickly restore to the normal working state after the test of the integrated OTDR ends, which avoids ONU disconnection, and service interruption due to the test, and is capable of ensuring performance of the test of the integrated OTDR, decreasing system processing complexity while reducing influence of the test on communication, and improving customer satisfaction.

In each of the above embodiments, optical central office equipment integrated with an optical time domain reflectometer or optical central office equipment integrated with an optical frequency domain reflectometer is included. A system for testing an optical network may be formed by connecting the optical central office equipment and other optical network equipment. In the system for testing an optical network, the optical central office equipment may be an OLT.

The optical central office equipment is configured to obtain a maximum test time of a single group test, divide a total test time into at least two groups of single group test time that is not greater than the maximum test time when the total test time is greater than the maximum test time of the single group test, perform the single group tests in sequence according to each single group test time, and instruct the optical network equipment to restore to a normal working state when the single group test time corresponding to each single group test ends.

Apart from being applied to the OLT integrated with the OTDR or OFDR, the method and the apparatus according to the embodiments of the present invention may also be applied to other optical central office equipment. Definitely, the method and the apparatus according to the embodiments of the present invention may be applied to other optical network equipment integrated with an OTDR or OFDR if necessary, which are not limited to the optical central office equipment, but may also be applied to any optical network equipment capable of accomplishing a test function in the optical network, for example, optical switch equipment or optical terminal equipment.

Through the above description of the embodiments, it may be clearly understood by persons skilled in the art that the present invention may be accomplished by software on necessary universal hardware, and definitely may also be accomplished by hardware, but in most cases, the present invention is preferably implemented through the former method. Based on this, the technical solutions of the present invention or the part that makes contributions to the prior art can be substantially embodied in the form of a software product. The computer software product may be stored in a readable storage medium, for example, a floppy disk, a hard disk, or an optical disk of a computer, and include several instructions used to instruct computer equipment (for example, a personal computer, a server, or network equipment) to perform the method according to the embodiments of the present invention.

The above is merely the specific implementation of the present invention, but the protection scope of the present invention is not limited thereto. Any change or replacement that may be easily figured out by persons skilled in the art within the technical scope disclosed by the present invention shall be covered by the protection scope of the present invention. Therefore, the protection scope of the present invention is subject to the protection scope of the claims.

What is claimed is:

1. A method for testing an optical network, comprising:
   obtaining a maximum test time for a group of tests;
   determining that a total test time is greater than the maximum test time;
   dividing the group of tests into at least two groups of tests, wherein each of the at least two groups of tests has a test time that is not greater than the maximum test time; and
   performing each individual group of tests of the at least two groups of tests,
   wherein after each of the individual group of tests of the at least two groups of tests has ended, instructing an optical network equipment to restore a working state which performs data processing.

2. The method for testing an optical network according to claim 1, wherein the dividing comprises:
   dividing the total test time by the maximum test time and rounding up to obtain the number of the at least two groups; and dividing the total test time by the number of groups to obtain the test time corresponding to each group.

3. The method for testing an optical network according to claim 1, wherein the performing each individual group of tests of the at least two groups of tests comprises:
   stopping sending communication data to an optical fiber;
   cyclically sending a test signal during each of the at least two groups of tests; and
   monitoring a returned signal, wherein the returned signal includes one or both of a reflected test signal and a scattered test signal.

4. The method for testing an optical network according to claim 1, wherein the method further comprises:
   preferentially processing a service with a high priority after instructing the optical network equipment to restore the working state.

5. The method for testing an optical network according to claim 1, wherein the obtaining the maximum test time comprises:
   using a maintaining time of a state timer in the optical network equipment as the maximum test time when the optical network equipment is not configured with a real-time service;
   using a state maintaining time of a real-time service as the maximum test time when the optical network equipment is configured with the real-time service and the state maintaining time of the real-time service is greater than the maintaining time of a state timer in the optical network equipment; and
   using a maintaining time of a state timer in the optical network equipment as the maximum test time when the optical network equipment is configured with a real-time service and the state maintaining time of the real-time service is not greater than the maintaining time of the state timer in the optical network equipment.

6. The method for testing an optical network according to claim 1, wherein the performing the at least two groups of tests according to the test time of each of the at least two group of tests occurs after a service with a high priority is processed.

7. The method for testing an optical network according to claim 1, wherein the obtaining the maximum test time comprises: obtaining the maximum test time when a loss of signal alarm or a loss of frame alarm of a port to be tested is not monitored.

8. An apparatus for testing an optical network, applicable to an integrated optical time domain reflectometer, comprising:
   an obtaining unit configured to obtain a maximum test time for a group of tests;
   a grouping unit configured to divide the group of tests into at least two groups of tests, if it is determined that a total test time is greater than the maximum test time, wherein each of the at least two groups of tests has a test time that is not greater than the maximum test time;
   a test unit configured to perform each individual group of tests of the at least two groups of tests; and
   an instruction unit configured to instruct an optical network equipment to restore a working state which performs data processing after each of the individual group of tests of the at least two groups of tests has ended.

9. The apparatus for testing an optical network according to claim 8, wherein the test unit comprises:
   a control module, configured to control stopping sending communication data to an optical fiber;
   a sending module, configured to cyclically send a test signal during each of the at least two groups of tests; and
   a monitoring module, configured to monitor a returned signal, wherein the returned signal includes one or both of a reflected test signal and a scattered test signal.

10. The apparatus for testing an optical network according to claim 8, wherein the obtaining unit obtains the maximum test time when a loss of signal alarm or a loss of frame alarm of a port to be tested is not monitored.

11. A passive optical network system, wherein the system comprises central office equipment, wherein
   the central office equipment is configured to obtain a maximum test time for a group of tests, divide a group of tests into at least two groups of tests, wherein each of the at least two groups of tests has a test time that is not greater than the maximum test time if it is determined that a total test time is greater than the maximum test time, perform each individual group of tests of the at least two groups of tests, and instruct an optical network equipment to restore a working state which performs data processing after each of the individual group of tests of the at least two groups of tests has ended.

* * * * *